United States Patent [19]

Welch et al.

[11] Patent Number: 4,861,497

[45] Date of Patent: Aug. 29, 1989

[54] METHOD FOR THE PROCESSING OF ORGANIC COMPOUNDS

[76] Inventors: James F. Welch, P.O. Box 1235, Boulder, Colo. 80306-1235; James D. Siegwarth, 85 S. 35th St., Boulder, Colo. 80303

[21] Appl. No.: 169,851

[22] Filed: Mar. 18, 1988

[51] Int. Cl.[4] ........................ C02F 1/74; C02F 11/08
[52] U.S. Cl. .................................. 210/759; 210/762; 210/763
[58] Field of Search ............... 210/758, 774, 761, 808, 210/177, 178, 181, 243, 747, 762, 149, 763

[56] References Cited

U.S. PATENT DOCUMENTS 4,564,458  1/1986  Burleson ........................... 210/761
4,751,005  6/1988  Mitsui et al. ....................... 210/759

*Primary Examiner*—Frank Sever
*Attorney, Agent, or Firm*—Fitch, Even, Tabin & Flannery

[57] ABSTRACT

This invention provides a method for the detoxification of aqueous solutions of organic compounds utilizing a liquid-phase oxidant such as hydrogen peroxide (aq) or ozone (aq). The aqueous solutions of organic compounds and the liquid-phase oxidant are mixed, then compressed and heated to bring the mixture into a supercritical phase. The oxidation reaction proceeds in the supercritical phase.

7 Claims, 1 Drawing Sheet

METHOD FOR THE PROCESSING OF ORGANIC COMPOUNDS

The present invention relates to a process for processing of organic compounds with a liquid-phase oxidizing agent in a supercritical-fluid reactor.

BACKGROUND OF THE INVENTION

The detoxification of aqueous solutions of organic compounds by separation or other unit operations of chemical engineering is not usually satisfactory in that the hazardous substances are merely transferred to another phase and must then be destroyed in another step or stored in a secure manner. The destruction of inorganic compounds has also created problems when a two-phase system is utilized because of the mass-transfer resistances associated with phase boundaries.

Systems which have recognized these problems are known, e.g., U.S. Pat. Nos. 4,338,199 and 4,543,190. However, these systems utilize gaseous oxidizers which results in substantial capital and operating costs.

It is an object of this invention to provide a method of processing organic compounds in a single supercritical aqueous phase, thereby eliminating the storage and mass transfer problems, and substantially reducing the capital and operating costs of existing detoxification systems.

SUMMARY OF THE INVENTION

A process is provided for the conversion of organic compounds to non-hazardous substances or to fuel gases. The process comprises the steps of (a) mixing a liquid phase oxidant with a feed stream which contains an organic compound in solution or deposited on the solids which form a slurry, (b) subjecting this oxidant-feed stream mixture to conditions necessary to yield a supercritical phase in a reaction area, and (c) returning the now non-hazardous stream to ambient temperature and atmospheric pressure while removing the stream from the reaction area. The conversion of the organic compounds to non-hazardous materials is effected in the supercritical phase.

DETAILED DESCRIPTION OF THE INVENTION

Figure 1:
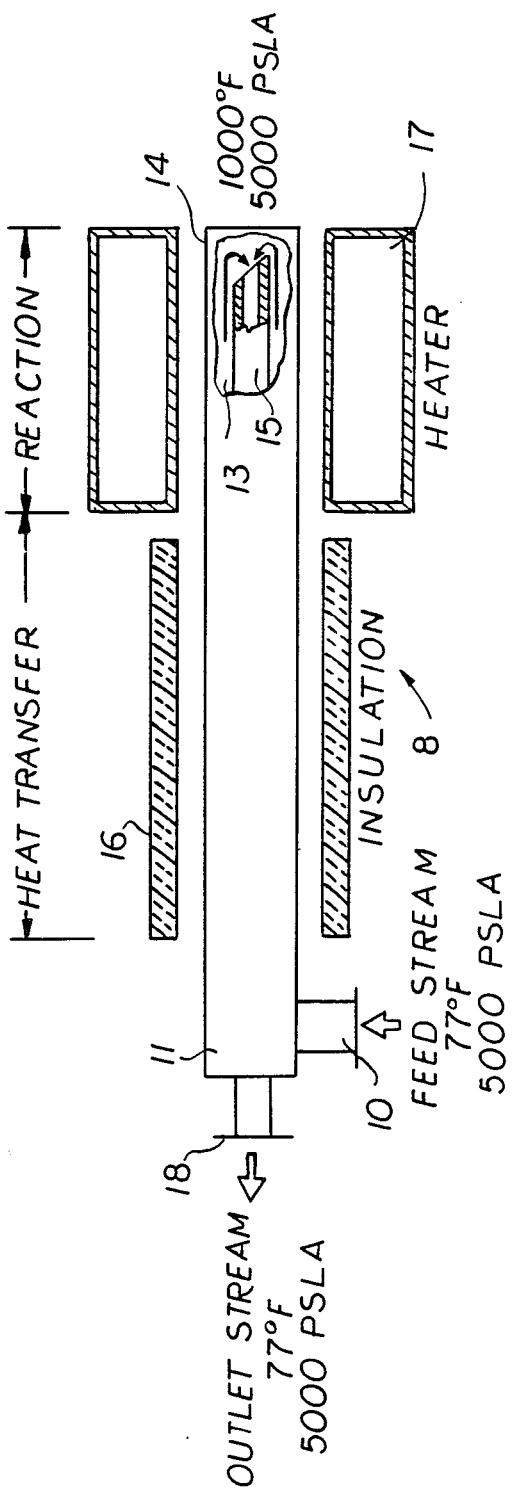
FIG. 1 is a schematic diagram of the preferred embodiment of this invention.

A method is described herein for the conversion of organic compounds to non-hazardous substances or to fuel gases ("producer" or "water-gas") and involves mixing (1) a liquid-phase oxidant such as hydrogen peroxide (aq), ozone (aq), liquid oxygen (LOX), or any other substance in solution or slurry form that decomposes to yield oxygen, with (2) a feed stream which contains an organic compound in solution or deposited on the solids which form a slurry.

The compression of air (approximately 21 and 79 mole % oxygen and nitrogen respectively) to liquid form for providing the oxidant has less merit than the use of hydrogen peroxide for the following reasons:

(1) The capital and operating expenses for the required compressor and high-pressure supply lines for the compression of air are substantial whereas, in this invention, a liquid-phase oxidant may be introduced directly into the substrate fluid.

(2) By virtue of the fact that air contains 79 mole % nitrogen, an inert substance for practical purposes with respect to the reactions of interest, the oxidant is diluted when compressed air is used which has the effect of reducing the overall reaction rate and thereby increasing the size of the equipment and the size of required gas-liquid separators. This is to be compared with the decomposition of hydrogen peroxide which produces one (1) mole of water for the reaction for every one-half mole of oxygen supplied. (3) There is evidence that the decomposition of the hydrogen peroxide will result in the formation of oxygen free radicals which attack bonds in a vigorous manner.

The mixing process may be on a continuous basis or may be a batch operation. Fluids such as mineral oils containing PCB's may be diluted and mixed into an aqueous phase by emulsification or comminution to form a feed stock for the process. Etiological agents, bacteriological warfare agents, and nerve gases may be detoxified in this process.

Specific examples of candidate feed streams and sources of non-gaseous oxygen are listed in Table 1.

TABLE 1

Candidate Feed Streams

Dispersions, emulsions, or solutions of waste solvents.
Wastewater streams containing organic compounds.
Etiological agents.
Bacteriological warfare agents.
Nerve gases.
Bilge oil.
Slurries contaminated with hazardous wastes.
Sludges containing organic compounds.
Torpedo wash water.
Wastewater containing nitroaromatics from TNT manufacturing processes.
Out-of-specification oils.
Mineral oils contaminated with PCBs.

Candidate Non-Gaseous Oxygen Sources

Hydrogen peroxide (aq).
Ozone (aq).
Inorganic oxides that decompose to yield oxygen.
Electrolysis of water inside the reactor.
Equilibrium dissociation of water.

The unreacted mixture of the liquid phase oxidant and organic compound is then subjected to a two step process, isothermal compression followed by isobaric heating, to bring it into a supercritical phase where the oxidation reaction proceeds quickly.

FIG. 1 is a schematic drawing of a preferred embodiment of this invention, depicted generally at 8, but other arrangements are possible. The mixture of liquid-phase oxidant and aqueous organic solution or slurry is compressed by conventional methods to the operating pressure of the reactor, about 5000 psia, and flowed to an inlet 10, of a bayonet-type tubular reactor 11. The fluid enters into an annular region or annulus 13, which is defined between an outer tube 14 and an inner tube 15. The entering fluid exchanges energy with the exiting fluid in the inner tube 15 of the reactor 11 in an approximately isobaric heating process. Insulation 16, may be fitted around the entry-exit end of the reactor 11 to minimize heat loss. Since the heat exchange between the entering and exiting streams is not complete in that the exit stream temperature can only approach the entering stream temperature to some amount, say ten (10) degrees, an additional heat exchanger, not shown, may be used to adjust the exit stream temperature to the desired level. The entering fluid in the annulus 13 passes into a downstream section of the reactor 11 surrounded by a heater 17, or by a heat exchanger heated by hot gases from an existing combustion process to supplement or substitute for the energy requirements supplied by the heater 17.

Thermal energy is transferred to the fluid raising its temperature to approximately 1000° F. which increases the reaction rate. At these conditions, the fluid will be in a supercritical state and n a single phase since the organic compounds and the oxygen are miscible in the supercritical water. As the reactants and the products are in a single phase, there will be no hindrance to the reaction process due to mass-transfer resistance across phase boundaries. The flow reverses direction at the end of the outer tube 14 and enters the inner tube 15 of the reactor 11, and subsequently exits the system at the outlet 18, after exchanging thermal energy with the incoming fluid flowing in the annulus 13.

The requirement of bringing the mixture to a supercritical phase for effective conversion of organic compounds demands a reactor which can sustain the extreme conditions. The bayonet-type tubular reactor 11 will therefore be able to sustain pressures of greater than 3200 psia and temperature greater than 710° F.

The chemical reaction taking place in this process requires hydroxyl radicals and oxygen to be formed in the fluid phase by the dissociation of water and the decomposition of the liquid-phase oxidant respectively. An expression for the decomposition of a typical liquid-phase oxidant, hydrogen peroxide, is:

$$0 = (-1)H_2O_2 + (\tfrac{1}{2})O_2 + (1)H_2O.$$

This decomposition provides the oxygen necessary and allows for the oxidation of the target organic species which is generalized as $C_iH_jO_kN_lS_mCl_nI_p$ in the following equation.

$$0 = v_1C_iH_jO_kN_lS_mCl_nI_p + v_2O_2 + v_3CO_2 + v_4H_2O + v_5N_2 + v_6SO_2 + v_7HCl + v_8 I$$

The symbols "$v_1...v_8$" represent the stoichiometric coefficients for the associated species. Hydroxyl radicals from the dissociation of water are an intermediate species and are not shown explicitly. An "atom balance" which yields the stoichiometric coefficients for the reaction is set forth in Table 2.

TABLE 2

| Atom | Species | Reactants | Products |
|---|---|---|---|
| C | carbon | $v_1i$ | $v_3$ |
| H | hydrogen | $v_1j$ | $2 v_4 + v_7$ |
| O | oxygen | $v_1k + 2 v_2$ | $2v_3 + v_4 + 2 v_6$ |
| N | nitrogen | $v_1l$ | $2 v_5$ |
| S | sulfur | $v_1m$ | $v_6$ |
| Cl | chlorine | $v_1n$ | $v_7$ |
| I | inert | $v_1p$ | $v_8$ |

Stoichiometric Coefficients with $v_1 = -1$
$v_2 = (-\tfrac{1}{2})[2i + (j - n)/2 + 2m - k]$
$v_3 = i$
$v_4 = (j - n)/2$
$v_5 = \tfrac{1}{2}l$
$v_6 = m$
$v_7 = n$
$v_8 = p$ The oxidation reaction will require "v2/v1", or [2i+(j-n)/2+2m- k]/2, moles of oxygen for stoichiometery. Additional oxygen is usually required to drive the reaction toward the desired complete destruction of the hazardous organic species.

If the amount of oxygen supplied to the reactor were less than that required for stoichiometery, the formation of carbon monoxide, CO, is favored. Reactor operating conditions may then be adjusted to promote the "water-gas shift reaction;"

$$0 = (-1)CO + (-1)H_2O + (1)H_2;$$

to generate fuel gases.

Typical fuel gas compositions from this process are 15% hydrogen, 30% carbon monoxide, and the balance nitrogen and carbon dioxide, by volume. The gases separated from the reactor effluent may then be fed to a combustion air fan for a gas-fired furnace or boiler for purposes of combustion or energy conversion. The active volume of the reactor 11 may be packed with iron-chromium oxide based catalyst to enhance the reaction rate.

Another possible reaction adjustment is that of the feed stock composition. The composition of the organic compound(s) in the entering fluid may be adjusted to a level such that the energy required to heat the fluid to operating temperature and that lost from the exterior surface of the reactor 11 is supplied by energy released by chemical reaction. However, the greatest application of this processing method is expected to be the detoxification of aqueous solutions containing typically 1% by weight organic compounds.

Recovery of the pressure energy from the effluent stream can be accomplished by utilizing a hydraulic engine or turbine (not shown).

EXAMPLE 1

Propylene glycol at a concentration of approximately 1000 ppm(wt) in water together with sufficient hydrogen peroxide to supply approximately 10% excess oxygen for the reaction (assuming complete decomposition of the hydrogen peroxide) was fed to a supercritical fluid reactor 8 of the type described above.

Propylene glycol (PG) was chosen as a surrogate for the principal component of Otto II fuel for the Mark 48 and Mark 46 torpedoes, propylene glycol dinitrate (PGDN), since the test apparatus was not constructed of materials resistant to nitric acid, a reaction product. An appropriate cation could be added to the feed stock to neutralize the acidic reaction products.

In a similar fashion, one would choose toluene as a surrogate for mono-, di-, and trinitrotoluene which form the hazardous components of the "redwater" waste streams from military arsenals.

Nominal values greater than 96.5% conversion of the PG were obtained for operating conditions of 750°–860° F. and 5000 psia. The operating conditions and results are listed in Table 3.

TABLE 3

| Sample | Temperature deg F. | Pressure atm | Rate g/min | Conversion % |
|---|---|---|---|---|
| 1 | 860.5 | 322.2 | 19.2 | 96.7, 98.3 |
| 2 | 785.0 | 352.8 | 39.2 | 96.7, 97.1 |
| 3 | 750.9 | 353.5 | 65.1 | 96.7, 97.1 |
| 4 | 747.0 | 353.5 | 92.0 | 97.1, 97.9 |

The two values listed under the conversion in terms of percent represent the analysis of samples taken at the midpoint and the exit of the reactor 11 respectively.

The residence time of Samples 1-4 varied due to the change in feed rate. The tubular reactor 11 used was 10 feet long with about 1.5 feet extending into the heater 17. The outer tube 14 has an inside diameter of one-half inch and the inner tube 15 has a diameter of one-quarter inch with a wall thickness of 0.010 inches. The residence times were 5.3, 4.2, 5.7, and 4.0 seconds, respectively. The results show that for feed rates of less than 92 g/min, the conversion percent was not greatly affected by residence time, thus indicating that the oxidation reaction proceeds quickly.

From the above description, it can be seen that by using a bayonet-type tubular reactor 11 with a liquid phase oxidant at supercritical conditions, one phase exists, thus eliminating mass-transfer resistances associated with phase boundaries, and the oxidation reaction proceeds quickly and greatly favors the products. The temperature and pressure of operation also assures that the fluid density is approximately that of a liquid rather than a gas or vapor, thus requiring a relatively small reactor volume per unit mass of reactants and products.

Furthermore, no pretreatment of the feed stock is required; the process may be used to treat organics at relatively low concentrations in the aqueous phase; and the reactor may be operated in such a manner to produce gaseous fuels by proper choice of operating conditions or use of catalysts thereby altering in a positive way the economics of the disposal process for hazardous materials.

Although the invention has been illustrated and described with regard to certain particularly preferred embodiments, it should be understood that changes and modifications as would be obvious to one having the ordinary skill in the art may be made without deviating from the scope of the invention which is set forth in the appended claims.

Particular features of the invention are emphasized in the following claims.

What is claimed is:

1. A method of oxidizing an organic material which comprises:
   mixing an oxidant in a liquid phase with an aqueous feed, stream containing therein an organic compound to be oxidized substantially only outside of a reaction zone;
   compressing said mixture to a pressure in excess of 3200 psia;
   heating said mixture to a reaction temperature of greater than 710° F. and into a supercritical phase for a time sufficient to decompose said oxidant and oxidize the organic compound within said reaction zone;
   cooling said reacted mixture by counter current flow of said reacted mixture to said unreacted mixture; and
   collecting the said reacted and cooled mixture.

2. A method according to claim 1 wherein said liquid phase oxidant is mixed with said feed stream containing the organic compound in at least a stoichiometric amount for the oxidation reaction.

3. A method according to claim 1 wherein said liquid phase oxidant is mixed with said feed stream containing the organic compound in an excess of the stoichiometric amount for the oxidation reaction.

4. A method according to claim 1 wherein said liquid phase oxidant is mixed with said feed stream containing the organic compound in a deficiency of the stoichiometric amount for the oxidation reaction.

5. A method according to claim 1 wherein said liquid phase oxidant is selected from the group consisting of hydrogen peroxide (aq), ozone (aq), inorganic oxides that decompose to yield oxygen or mixtures thereof.

6. A method according to claim 5 wherein the oxidant is hydrogen peroxide.

7. A method according to claim 1 wherein the oxidant and the said organic compound(s) are fed in such amounts as to provide heat of reaction sufficient to maintain the reaction temperature.

* * * * *

UNITED STATES PATENT AND TRADEMARK OFFICE
CERTIFICATE OF CORRECTION

PATENT NO. : 4,861,497
DATED : August 29, 1989
INVENTOR(S) : James F. Welch et al.

It is certified that error appears in the above-identified patent and that said Letters Patent is hereby corrected as shown below:

column 3, line 5, after "reactor" delete "11".

Column 3, line 13, change "n" to --in--.

Column 3, lines 41-42, In the equation, change all capital V's to lower case v's; change all v's to lower case v's.

Column 4, line 10, In the equation, after "$H_2O$" insert --+ (1) $CO_2$--

Column 6, line 4, after "feed" delete comma.

Signed and Sealed this

Seventeenth Day of July, 1990

Attest:

HARRY F. MANBECK, JR.

*Attesting Officer*     *Commissioner of Patents and Trademarks*